United States Patent [19]
Vosteen et al.

[11] 3,851,247
[45] Nov. 26, 1974

[54] ELECTROMETER ARRANGEMENT WITH AMPLITUDE STABILIZED OSCILLATOR DRIVE MEANS FOR DETECTOR ELEMENT

[76] Inventors: Robert E. Vosteen, 315 W. Center St.; Alan L. Werner, Jr., 304 W. Center St., both of Medina, N.Y. 14103

[22] Filed: Dec. 13, 1973

[21] Appl. No.: 424,222

Related U.S. Application Data

[62] Division of Ser. No. 269,454, July 6, 1972, Pat. No. 3,784,930.

[52] U.S. Cl. .................................. 324/72, 324/109
[51] Int. Cl. ......................... G01r 29/12, G01r 5/28
[58] Field of Search ................ 324/109, 32, 72, 111

[56] References Cited
UNITED STATES PATENTS

| | | | |
|---|---|---|---|
| 3,611,127 | 10/1971 | Vosteen | 324/72 |
| 3,772,592 | 11/1973 | Rhodes | 324/32 |

*Primary Examiner*—Alfred E. Smith
*Assistant Examiner*—Ernest F. Karlsen
*Attorney, Agent, or Firm*—Albert J. Santorelli

[57] ABSTRACT

An electrometer apparatus having an amplitude stabilized oscillator circuit with an electromechanical resonant transducer connected to the input of the oscillator active stage. The transducer has first and second terminals. A differentially connected operational amplifier is also provided having plus and minus inputs, the first terminal of the electromechanical resonant transducer being connected to the plus terminal of the operational amplifier, and the second terminal being connected to ground. A light emitting source is connected between the output of the operational amplifier and ground, and is responsive to the output of the operational amplifier to supply a corresponding amount of energy to a light responsive element connected to the output of the operational amplifier. A negative feedback path connected between the light responsive element and the minus terminal of the operational amplifier is also provided. The electrometer may be used to measure unknowns such as the electrostatic potential of a surface in non-contacting manner or an electrostatic field.

3 Claims, 2 Drawing Figures

ELECTROMETER ARRANGEMENT WITH AMPLITUDE STABILIZED OSCILLATOR DRIVE MEANS FOR DETECTOR ELEMENT

This is a division of application Ser. No. 269,454, filed July 6, 1972, now U.S. Pat. No. 3,784,930.

BACKGROUND OF THE INVENTION

1. Field of the Invention

The invention relates to an electrometer apparatus to measure unknowns such as the electrostatic potential of a surface in noncontacting manner or an electrostatic field, and employs an oscillator providing improved amplitude stability. The oscillator utilizes a two terminal electromechanical resonant element connected to its active stage, which vibrates a capacitor detector to produce a modulated signal representative of the unknown being measured.

2. Description of the Prior Art

The use of electrometer apparatus to measure unknowns such as the electrostatic potential of a surface in noncontacting manner or an electrostatic field is known in the art. Note U.S. Pat. No. 3,611,127 which employs a transducer to vibrate a capacitor detector at a predetermined frequency to produce a modulated signal representative of the unknown being measured. It is also known in the prior art that for purposes of efficiency, it may be desirable to operate an electromechanical transducer at its natural mechanical resonant frequency in order to produce a maximum amplitude of oscillation with the least drive power for the transducer.

If a separate oscillator is used to excite the transducer at resonance, various influences can cause a shift between the excitation frequency and the natural resonant frequency of the transducer. It is then necessary to provide a frequency adjustment in order to insure satisfactory operation. In the event of a shift in resonant frequency on the part of either the transducer or its excitation source, a significant phase shift can occur between the excitation signals and the mechanical displacement of the transducer, which may be objectionable for certain applications. For example, the oscillator may be used as a reference oscillator to excite the transducer whereby the mechanical displacement thereof produces modulated signals, and may also supply reference signals for application to a phase sensitive detector to effect demodulation of modulated signals, as in U.S. Pat. No. 3,611,127. Under such circumstances wherein a phase sensitive detector is utilized for phase sensitive or synchronous rectification, a fixed phase relationship between the reference signals and the mechanical displacement of the transducer is required.

It is thus preferably to employ the transducer to also function as the resonant element of the oscillator, in order to eliminate the need for frequency adjustments and provide a stable phase relationship between the electrical excitation signal of the oscillator and the mechanical displacement of the transducer.

SUMMARY OF THE DISCLOSURE

The invention relates to an oscillator that may be used in electrometer apparatus, having an electromechanical resonant transducer which functions as the resonant element of the oscillator to provide a constant amplitude excitation signal to the transducer that is substantially purely sinusoidal. The excitation signal thus provides constant conversion gain for the modulation action of the transducer, and the substantially sinusoidal waveform permits straight forward balancing out of any residual in-phase or quadrature unbalance in the modulated signal.

The oscillator according to the invention utilizes a two terminal resonant circuit such as a magnetic or PM dynamic transducer. Typically, mechanical resonance of the transducer occurs and is reflected into the electrical circuit of the oscillator as an electrical impedance which is maximized at resonance. One of the terminals of the two terminal resonant circuit is grounded, eliminating the necessity associated with most oscillators of requiring at least one additional terminal for feedback purposes. The grounding of one terminal of the two terminal resonant circuit permits a single, grounded coaxial shielded lead to interconnect the transducer and its associated active circuitry thus providing excellent and simple shielding between the excitation signals and any low level signal which might be carried in a shared multi-conductor cable.

The active device of the oscillator comprises a differentially connected operational amplifier having a light dependent resistance network which is responsive to the output of the operational amplifier to provide a constant amplitude excitation signal, having a waveform that is substantially purely sinusoidal. A light emitting device is also connected to the output of the operational amplifier to control the light dependant resistance network.

The electrometer apparatus may also include a wide band, non-inverting amplifier output stage, utilizing a photoemitter and light sensitive resistance means arrangement.

DETAILED DESCRIPTION OF THE DISCLOSURE

Figure 1:
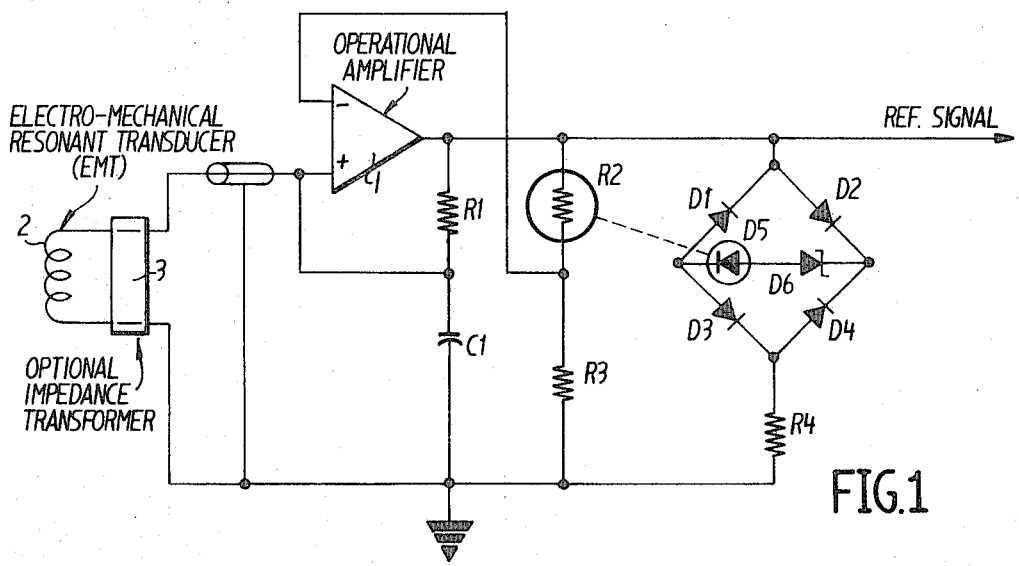
FIG. 1 is an electronic schematic diagram of the oscillator circuit according to the invention.

The oscillator circuit according to the invention is shown in FIG. 1. The active stage comprises a single differential input, single-ended output operational amplifier 1. A bridge network having passive linear resistors R1 and R3, electromechanical transducer 2, and light dependent resistance R2 is utilized. Thus the output of operational amplifier 1 may be traced through resistor R1 and transducer 2 to ground, and through resistance R2 and resistor R3 to ground. The common connection of resistance R2 and resistor R3 is connected to the minus (−) input of operational amplifier 1 to provide a negative feedback path which is utilized for amplitude stabilization purposes. The common connection of resistor R1 and electromechanical transducer 2 is connected to the plus (+) input of operational amplifier 1.

A full-wave bridge rectifier network comprising diodes D1, D2, D3 and D4 is connected in series with resistor R4 between the output of operational amplifier 1 and ground. The full-wave bridge rectifier network feeds the series connection of light emitting diode D5 and zener diode D6, the described series connection being connected at one end to the common connection of diodes D1 and D3, and at the other end to the common connection of diodes D2 and D4. The light emitting diode D5 is optically coupled to light dependent resistance R2. The full-wave bridge rectifier network is thus driven by the output of operational amplifier 1.

At the instant of energization of the oscillator circuit, corresponding to zero oscillator amplitude, light emitting diode D5 is not energized and the resistance of light dependent resistance R2 effectively presents an open circuit to the output of the operational amplifier 1 because it is not illuminated by diode D5. Consequently the negative feedback path for operational amplifier 1 is not complete and the oscillator amplitude increases. As the operational amplifier 1 output voltage, which is an alternating current voltage, increases such that it is sufficient to bias zener diode D6 to conduction, the light emitting diode D5 is energized and emits light which is coupled to dependent resistance R2. This causes light dependent resistance R2 to conduct and limit the amplitude of the oscillator at the output of the operational amplifier 1 to a stable, low distortion sinusoidal output voltage.

The light emitting diode D5 is thus activated by biasing zener diode D6 to conduction. The full-wave bridge rectifier network causes light emitting diode D5 to emit short bursts of light at twice the oscillator frequency. However, light dependent resistance R2 has a natural speed of response which is slow in comparison to one-half (½) of the period of the oscillator. Consequently light dependent resistance R2 exhibits a relatively stable resistance and insures a low distortion sinusoidal oscillator output. The particular light dependent resistance and light emitting diode utilized should be selected to insure that the spectral output of the light emitting diode adequately matches the spectral response curve of the light dependent resistor. An incandescent light could be substituted for the full-wave bridge network shown, however its speed-of-response is comparable to that of the light dependent resistance with the result that oscillator amplitude instability can occur in the amplitude stabilizing feedback loop. In contradistinction the light emitting diode D5 exhibits instantaneous response thus causing the light dependent resistance R2 to exhibit the only significant lag in the amplitude regulating feedback loop.

Resistor R4 is connected in series with the full-wave rectifier network to primarily control the duty cycle of the pulse current feeding the light emitting diode D5. Otherwise, a high momentary peak load on the operational amplifier output could cause overloading and clipping. Capacitor C1 shunts the electro-mechanical transducer 2 in order to swamp or subdue undesired high frequency oscillation components resulting from spurious electrical resonances occurring at frequencies well above the natural mechanical resonant frequency of the system. This swamping action is effected by the connection of capacitor C1 in shunt relation with the electromechanical transducer 2 without adversely influencing the desired resonant frequency output.

The optional impedance transformer 3 may be connected between the coaxial cable and the electromechanical transducer. This may be necessary if an odd impedance transducer is employed to insure proper drive power within the output voltage and current capability of operational amplifier 1.

When the operational amplifier 1 is operating, the ratio $R1/R(2) = R2/R3$ of the respective resistance values of elements comprising the bridge network is satisfied.

Figure 2:
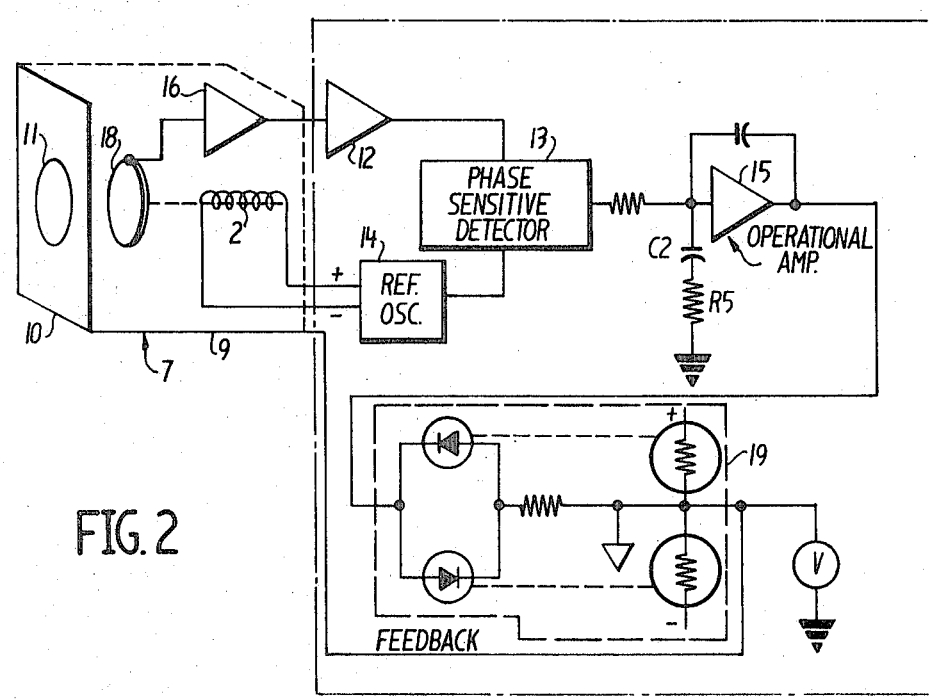
FIG. 2 illustrates the manner in which the oscillator circuit of FIG. 1 may be used in an electrometer apparatus.

FIG. 2 shows the manner in which the oscillator circuit described above and shown in FIG. 1 may be used in an electrometer apparatus of the type described in U.S. Pat. No. 3,611,127. FIG. 3 of this patent illustrates an electrostatic voltmeter and FIG. 4 shows an electrostatic fieldmeter. With respect to FIG. 2 of the instant application, transducer 2 is utilized to drive sensitive electrode 18 and is connected to oscillator 14 in the manner described with reference to FIG. 1. The probe assembly 7 of FIG. 2 is similar to that described in U.S. Pat. No. 3,611,127 and comprises bottom plate 10 having aperture 11, sensitive electrode 18 and preamplifier 16. The outputs of signal amplifier 12 and reference oscillator 14 are connected to phase sensitive detector 13. A photoemitter/photoconductor network 19 is connected to the output of operational amplifier 15 and operates in the manner described in U.S. Pat. No. 3,590,251 to provide a wide band, non-inverting amplifier at the output of the electrometer apparatus. This configuration can function as a voltage follower having a bandwidth permitting a signal to go through which is wider than the carrier, providing the photoconductors have sufficient speed-of-response. The series connection of R-5 and C-2 is connected between the summing junction of operational amplifier 15 and ground to provide feedback.

It is noted that the ground designation shown in FIG. 1 for the oscillator circuit would be the same connection as circuit common in FIG. 2, when the oscillator circuit of FIG. 1 is employed as reference oscillator 14 of the electrometer system shown in FIG. 2.

We claim:

1. In an electrometer apparatus to measure unknowns such as the electrostatic potential of a surface in noncontacting manner or an electrostatic field, having a capacitive detector positionable in electrostatic coupling relationship with the surface or in the electrostatic field to produce a detector signal representative of the magnitude and polarity of the unknown being measured for long-term static measurement, the improvement comprising:

an electromechanical resonant transducer having first and second terminals, operative to vibrate the capacitive detector at a predetermined frequency to vary the coupling relationship and produce modulated detector signals having a carrier frequency equal to the predetermined frequency, an amplitude stabilized reference oscillator circuit to produce reference signals at the predetermined frequency, a detector connected to receive the reference signals and modulated detector signals at a fixed phase relationship to demodulate the latter and produce an output signal indicative of the magnitude and polarity of the unknown being measured, said amplitude stabilized reference oscillator circuit including, a differentially connected operational amplifier having plus and minus inputs, the first terminal of the electromechanical resonant transducer being connected to the plus terminal of the operational amplifier, the second terminal being connected to ground, a light emitting source connected between the output of the operational amplifier and ground, and responsive to the output of the operational amplifier to supply a corresponding amount of energy to a light responsive element connected to the output of the operational amplifier, and a negative feedback connection connected between the light responsive element and the minus terminal of the operational amplifier.

2. The electrometer apparatus recited in claim 1 further comprising a wide band, non-inverting voltage follower connected to the output of the detector having an operational amplifier and a photoelectric network connected to pass a frequency range wider than the carrier frequency.

3. The electrometer apparatus recited in claim 1 further comprising a wide band, non-inverting voltage follower connected to the output of the detector.

* * * * *